UNITED STATES PATENT OFFICE.

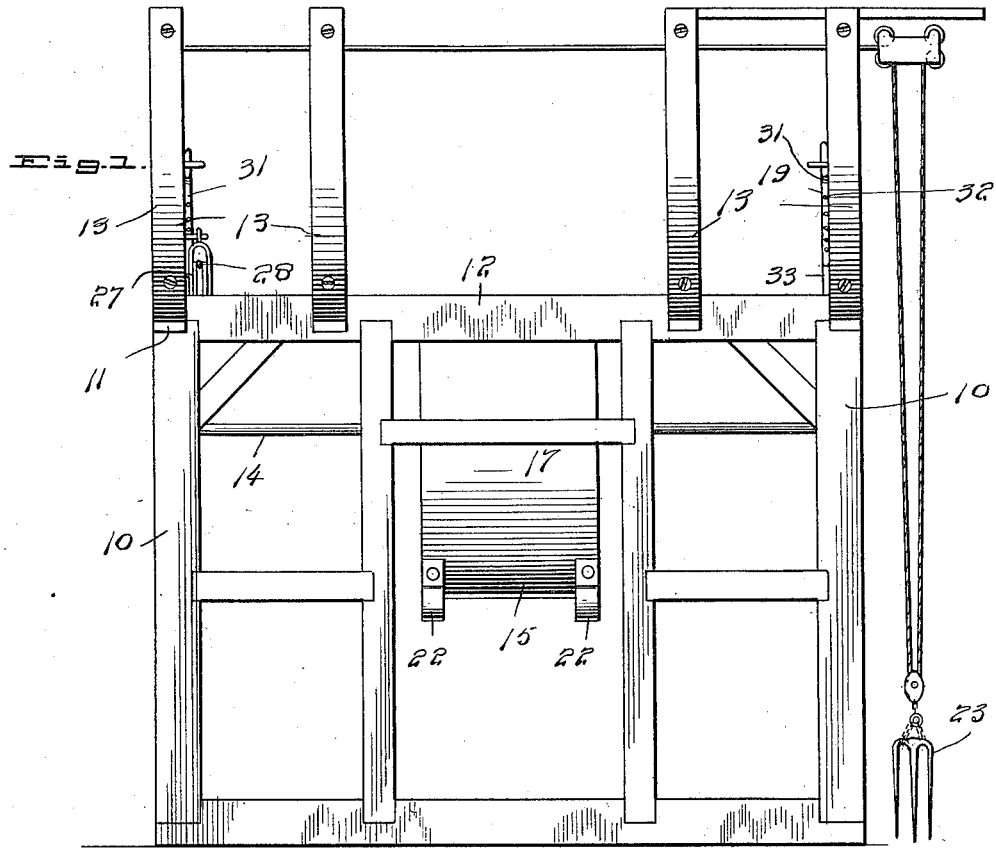
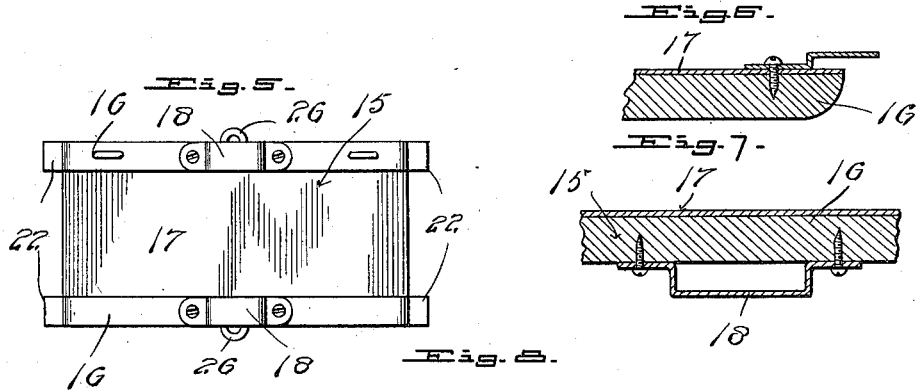
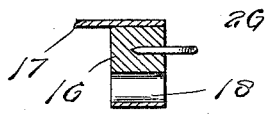

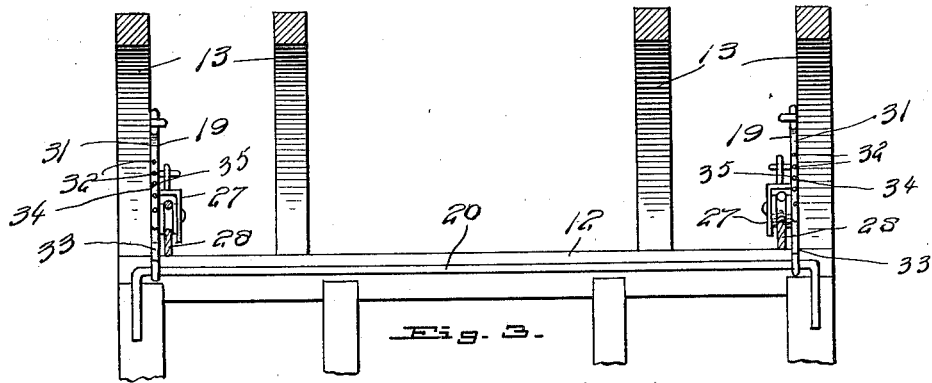
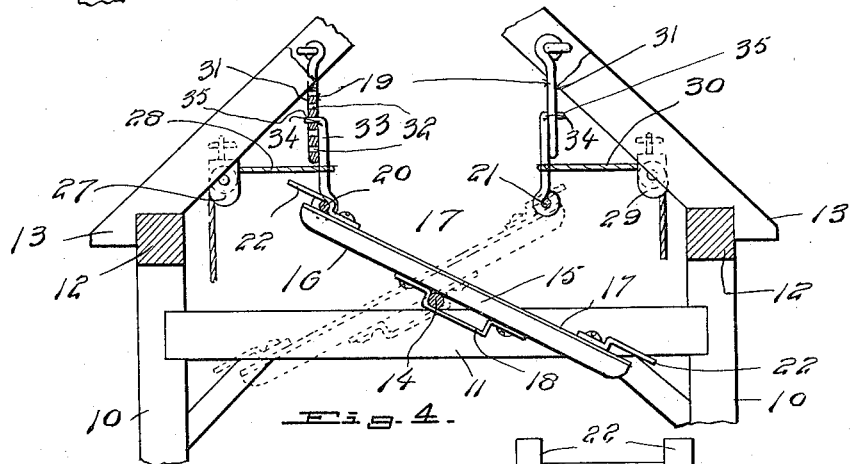
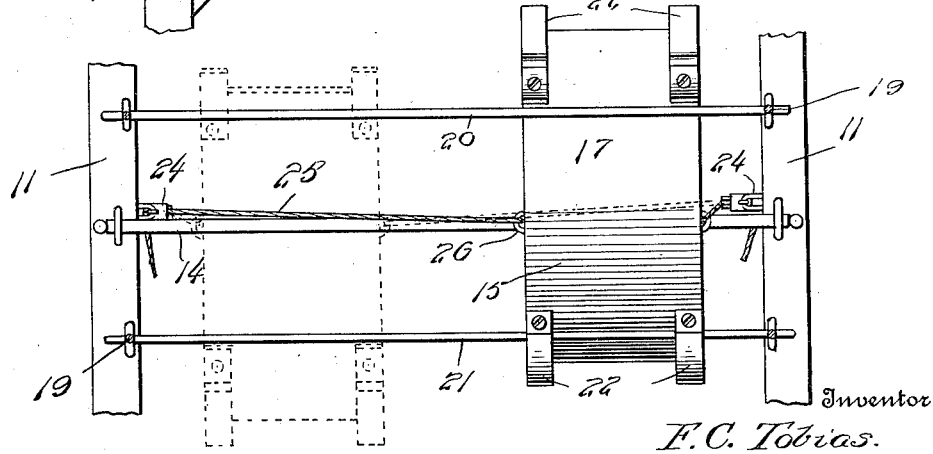

FRANK C. TOBIAS, OF FORT WAYNE, INDIANA.

HAY-DISTRIBUTER.

1,092,875.     Specification of Letters Patent.     Patented Apr. 14, 1914.

Application filed July 24, 1913.   Serial No. 780,992.

*To all whom it may concern:*

Be it known that I, FRANK C. TOBIAS, a citizen of the United States, residing at Fort Wayne, in the county of Allen, State of Indiana, have invented certain new and useful Improvements in Hay-Distributers; and I do hereby declare the following to be a full, clear, and exact description of the invention, such as will enable others skilled in the art to which it appertains to make and use the same.

This invention relates to hay distributers for barns and has for an object to provide a carriage that is movable longitudinally on a track that extends through the center of the bar, whereby the hay may be discharged from end to end of the barn, the carriage being further pivoted upon the track so as to be inclined toward one side and then the opposite side of the barn whereby to fill both sides with the hay.

A further object of the invention is to provide means for holding the carriage in either of its inclined positions such means being swingable into released position to release the carriage when desired.

A further object is to provide an extremely simple and inexpensive hay distributer which will be formed of a few strong and durable parts that will not easily get out of order.

With the above objects in view the invention consists of certain novel details of construction and combination of parts hereinafter fully described and claimed, it being understood that various modifications may be made in the minor details of construction within the scope of the appended claims.

In the accompanying drawings illustrating this invention:—Figure 1 is a side elevation of the hay distributer applied to the frame of a barn. Fig. 2 is a longitudinal sectional view showing one of the swinging frames for holding the distributer in one inclined position. Fig. 3 is a cross sectional view on the line 3—3 Fig. 1. Fig. 4 is a plan view showing the distributer in full lines in one position and in dotted lines in another position longitudinally of the track. Fig. 5 is an underneath plan of the carriage. Fig. 6 is a fragmentary sectional view through one of the corner clips for securing the carriage to the related swinging frame. Fig. 7 is a fragmentary sectional view through one of the guide brackets on the carriage. Fig. 8 is a fragmentary sectional view through the cable attaching means on the side of the carriage.

Referring now to the drawings in which like characters of reference designate similar parts, 10 designates the posts, 11 the beams, 12 the plates and 13 the rafters of the frame of the barn.

In carrying out my invention a rod 14 is secured at the ends to the opposite beams 11 of the frame and extends through the center of the barn. A carriage 15 is mounted to slide on this rod as a track, the carriage comprising side beams 16 which are connected by a sheet metal plate 17, there being elongated strap guide brackets 18 secured to the underneath faces of the side beams 16 and embracing the track, and serving to hang the carriage upon the track.

Supported by swinging hanger rods 19 on opposite sides of the track are rods 20 and 21 which are disposed above the track, and are disposed to normally extend parallel with the track. On each end of the carriage are offset fingers 22, these fingers being arranged at the corners of the carriage as shown, and being designed to engage with the related rod whereby to hold the carriage sloping toward one side or the opposite side of the barn so that hay dumped thereupon from the fork 23 will be discharged and fill in such side of the barn. The fingers are designed to slide freely upon the rod to facilitate the travel of the carriage longitudinally of the barn. When one side of the barn has become filled with hay, the carriage is turned over to incline toward the opposite side of the barn in order to fill the opposite side.

For drawing the carriage lengthwise of the track, a pair of sheaves 24 are secured to the beams 11 one on each beam below the adjacent end of the track, and a cable 25 is trained through these sheaves and terminally connected to respective eyes 26 secured in the sides of the carriage, the bight of the cable being disposed anywhere within convenient reach of the operator whereby upon pulling the cable in the proper direction the carriage may be slid longitudinally upon the track.

For rocking each of the swinging rods 20 and 21 out from engagement with the carriage, a sheave 27 is secured to one of the end rafters and a cable 28 is trained through this sheave and connected to the adjacent end of the rod 20, likewise a sheave 29 is secured to the opposite rafter and a cable 30 is trained through this sheave and connected to the rod 21. Both these cables are led to within convenient reach of the operator.

In operation suppose that the rod 20 is in engagement with the carriage and the carriage is sloping as shown toward that side of the barn opposite from the rod 20. The hay from the fork is now dumped on to the carriage and the carriage gradually moved along the track by means of the cable 25 until that side of the barn is filled with hay. The rod 20 is now pulled out to release the carriage. The operator now engages the opposite end of the carriage with the rod 21 to tilt the carriage in the opposite direction for filling the opposite end of the barn with hay. When both sides of the barn have been filled in this manner the middle of the barn is filled by the fork alone.

From the above description it will be seen that with this device in operation one or more men will not be needed in the mow as usual, and that the barn may be evenly filled with hay by simply manipulating the carriage. It will further be observed that the device is formed of a few simple strong and durable parts that are inexpensive to manufacture and will not easily get out of order.

In order to vary the tilted angle of the carriage when desired, each of the swinging rods 19 comprise an upper section 31 having preferably a series of six openings 32 therethrough, and a lower section 33 having a hooked upper end 34 adapted to be selectively passed through any one of these openings, and a pin 35 being then passed through said hooked end to secure the sections together. Each swinging rod is thus made longitudinally adjustable whereby the angle of the carriage relatively to the horizontal may be varied as desired.

What is claimed, is:—

1. In a hay distributer, the combination with a single track rail, of a carriage centrally pivoted and slidable longitudinally upon said rail, and means pivoted above and on both sides of said rail for yieldably holding said carriage in either of two opposite tilted positions.

2. In a hay distributer, the combination with a single track rail, of a carriage having strap brackets on the underneath face loosely embracing said track and mounting said carriage for tilting movement in either of two opposite directions and for sliding movement longitudinally of said track, and means pivoted above and on opposite sides of said rail for yieldably holding said carriage in either of its two tilted positions.

3. In a hay distributer, the combination with a single track rail, of a carriage centrally pivoted for longitudinal sliding movement thereupon and adapted to tilt in either of two directions on said track rail, there being offset fingers on the corners of said carriage, a swinging rod on each side of and above said track rail engageable with the related offset fingers on the adjacent side of said carriage whereby to hold said carriage in tilted position, means for moving said carriage longitudinally of said track in either of its tilted positions, and means for swinging said swinging rods out of engagement with said carriage.

In testimony whereof, I affix my signature, in the presence of witnesses.

FRANK C. TOBIAS.

Witnesses:
E. V. EMRICK,
MARJORIE M. OSBORN,
SUSILLIA TOBIAS.

---

Copies of this patent may be obtained for five cents each, by addressing the "Commissioner of Patents, Washington, D. C."